United States Patent [19]

Barnes et al.

[11] 4,247,684

[45] Jan. 27, 1981

[54] POLYMERIZATION OF 2-PYRROLIDONE WITH CESIUM OR RUBIDIUM CATALYST

[76] Inventors: Carl E. Barnes, 482 Trinity Pass Rd., New Canaan, Conn. 06840; Arthur C. Barnes, 320 Stamford Ave., Stamford, Conn. 06902

[21] Appl. No.: 84,815

[22] Filed: Oct. 15, 1979

Related U.S. Application Data

[60] Division of Ser. No. 39,773, May 17, 1979, which is a continuation-in-part of Ser. No. 899,066, Apr. 24, 1978, abandoned.

[51] Int. Cl.$^3$ .............................................. C08G 69/24
[52] U.S. Cl. .................................... 528/313; 528/312; 528/326
[58] Field of Search ........................ 528/313, 312, 326

[56] References Cited

U.S. PATENT DOCUMENTS

| | | | |
|---|---|---|---|
| 2,638,463 | 5/1953 | Ney et al. .............................. | 528/326 |
| 2,809,958 | 10/1957 | Barnes et al. ......................... | 528/326 |
| 2,973,343 | 2/1961 | Ney ....................................... | 528/326 |
| 3,060,153 | 10/1962 | Follett ................................... | 528/326 |
| 3,069,392 | 12/1962 | Clark et al. ........................... | 528/326 |
| 3,174,951 | 3/1965 | Taber .................................... | 528/326 |
| 3,721,652 | 9/1970 | Barnes .................................. | 528/326 |
| 3,835,100 | 9/1974 | Sekiguchi et al. ................... | 528/326 |
| 4,098,774 | 7/1978 | Bacskai ................................ | 528/315 |
| 4,105,645 | 8/1978 | Barnes et al. ........................ | 528/313 |

OTHER PUBLICATIONS

Die Makromolekulare Chemie, 161, p. 64, (1972).

*Primary Examiner*—Harold D. Anderson

[57] ABSTRACT

There is disclosed a method of forming pure white polymers of 2-pyrrolidone when using $SO_2$ as the activator. The method involves the use of the rubidium or cesium salt of 2-pyrrolidone as the alkaline catalyst in place of the sodium or potassium salt customarily used and which cause the formation of yellow polymer.

2 Claims, No Drawings

POLYMERIZATION OF 2-PYRROLIDONE WITH CESIUM OR RUBIDIUM CATALYST

RELATED APPLICATIONS

This application is a division of Application Ser. No. 039,773 filed May 17, 1979, which in turn is a continuation-in-part of Application Ser. No. 899,066, filed Apr. 24, 1978, now abandoned.

BACKGROUND OF THE INVENTION

This invention relates to the polymerization of 2-pyrrolidone and more particularly to the formation of polymers which are white in color and have thermal characteristics such that they may be melt extruded when $SO_2$ is used as the chain initiator.

The formation of polymers of 2-pyrrolidone involving the use of alkaline catalysts under substantially anhydrous conditions was first disclosed in U.S. Pat. No. 2,638,463. The best catalysts are the alkali metal salts of 2-pyrrolidone which are best formed from the alkali metal hydroxides. The lithium salt is very sparingly soluble and therefore is not a good catalyst and since both rubidium and cesium hydroxides are very expensive, in actual practice either the sodium or potassium salt is normally used.

Subsequent patents, for example U.S. Pat. No. 2,809,958, further disclose the need for a co-catalyst or "activator" for the polymerization. U.S. Pat. No. 3,174,951 discloses the use of $SO_2$ as an activator and U.S. Pat. No. 3,721,652 discloses the use of $CO_2$. Both of these activators result in the formation of a polypyrrolidone having superior thermal characteristics not found in polymers formed when other activators are used. While the polymer formed when $CO_2$ is used is white, that formed when $SO_2$ is used is ordinarily yellow unless carefully controlled amounts of $SO_2$ are used under certain critical temperatures as disclosed in U.S. Pat. No. 4,105,645. The use of $SO_2$ is advantageous however in that lower temperatures for the polymerization may be used as well as much smaller amounts of the activator. It is therefore very desirable to provide a method of preventing the formation of yellow polymer since the color greatly limits its use.

SUMMARY OF THE INVENTION

Although all the alkali metal salts of 2-pyrrolidone, with the exception of the lithium salt, have been regarded as equivalent for use as alkaline catalysts in the polymerization of 2-pyrrolidone, we have found to our surprise that both the rubidium and the cesium salts are markedly different in that they prevent the formation of yellow polymer when $SO_2$ is used as the activator. When either of these salts is used the polymerization temperature and the amount of $SO_2$ used is no longer very critical as it is when either the sodium or potassium salt is used.

Because both rubidium and cesium hydroxides are expensive they should be recovered for economic reasons. There are no extra steps involved however since the unpolymerized 2-pyrrolidone should be recovered anyway and the rubidium or cesium hydroxide is recovered automatically in the process. The only precaution needed is to prevent contact with the $CO_2$ of the atmosphere during the washing procedure since both rubidium and cesium hydroxides form carbonates very readily.

DETAILED DESCRIPTION OF A PREFERRED EMBODIMENT

The invention is practiced in exactly the same manner as when using sodium or potassium hydroxide to form the alkali metal salt of 2-pyrrolidone. The rubidium or cesium hydroxide is preferably added as an aqueous solution the the 2-pyrrolidone and the water, including that formed by reaction of the alkali metal hydroxide with the amide group of the pyrrolidone, is distilled off under vacuum. The mixture is made anhydrous by distilling over about 10% of the 2-pyrrolidone and after cooling to room temperature the $SO_2$ activator is added.

The amount of rubidium or cesium hydroxide used may range from about 0.01 to 0.15 mols per mol of 2-pyrrolidone, more preferably from about 0.03 to 0.08 mols and most preferably from about 0.04 to 0.055 mols in order to obtain optimum polymerization rates and polymers having high molecular weights and good thermal characteristics. The preferred polymerization temperature is from about 20° to 60° C. while the most preferred is from 38° to 42° C. The amount of $SO_2$ activator may range from about 0.002 mols per mol of 2-pyrrolidone to about 0.01 mols per mol of 2-pyrrolidone with the preferred range being from 0.004 to 0.008 mols per mol of 2-pyrrolidone.

In the following examples the viscosity measurements were made using a 5% solution of the polymer in 88% formic acid. When the polymer had completely dissolved at room temperature, the solution was poured into an empty Gardner Bubble Viscometer tube for comparison at 25° C. with the bubble flow of Gardner Number VG-7380 standard bubble tubes. The values are reported in Stokes but for comparison with other reported viscosities are also converted to the corresponding value for inherent viscosity when measured as a 0.5 gram per deciliter (g/dl) solution in hexafluoroisopropanol (HFIP) at 25° C.

EXAMPLE 1

100 grams of purified 2-pyrrolidone was added to a 250 ml 3-necked flask equipped with a gas inlet tube, a thermometer for measuring pot temperature and a distillation head also having a thermometer for measuring the temperature of the vapor. The distillation head was connected to a condenser and a receiver having a vacuum connection. Water at about 30°-35° C. was circulated through the condenser for cooling.

5.0 grams of 99% assay rubidium hydroxide (0.05 mol) was added and the system evacuated to a pressure of 10 mm mercury. About 15 grams of the pyrrolidone was distilled over to remove the water formed by the reaction of the rubidium hydroxide with the pyrrolidone. In this small volume the heat evolved in the reaction is not a problem but if larger batches are made the rubidium hydroxide should be added as an aqueous solution.

The mixture was then cooled to room temperature and 0.008 mols of $SO_2$ added in order to exaggerate the tendency to form color. The mixture was then poured into a polyethylene polymerization bottle, tightly capped and placed in a polymerization oven at 50° C. After 21 hours the white polymer cake was removed, ground and washed with water. After drying the conversion was found to be 63% and the viscosity was 27 Stokes corresponding to an HFIP inherent viscosity of 5.6 dl/g. The dried polymer was pure white.

EXAMPLE 2

The procedure of Example 1 was followed except that 8.8 grams of 85% assay cesium hydroxide (0.05 mol anhydrous) was added instead of the rubidium hydroxide. In removing the water formed by vacuum distillation it was observed that the cesium salt of pyrrolidone precipitated while hot but redissolved again on cooling to room temperature. The same effect was observed with the rubidium salt but to a much lesser extent.

After polymerizing for 20 hours at 50° C. the resulting pure white cake was ground, washed with water and dried. The conversion was found to be 60% and the viscosity was 60 Stokes which corresponds to an IV of 6.3 (HFIP). Again with this amount of $SO_2$ and a polymerization temperature of 50° C. the polymer formed when potassium hydroxide is used is yellow whereas this polymer is snow white.

Both rubidium and cesium hydroxides are expensive but since they are completely recovered along with unpolymerized 2-pyrrolidone in the wash water, they may be recycled indefinitely. The only precaution needed is to use water which is free of carbon dioxide for the washing step and prevent contact with the atmosphere during washing so that rubidium or cesium carbonate does not form.

Since certain changes may be made in the processes as disclosed without departing from the scope of the invention, it is intended that the examples as well as all contained in the foregoing description be interpreted as illustrative and not in a limiting sense.

What is claimed is:

1. The method of polymerizing 2-pyrrolidone comprising contacting a substantially anhydrous mixture of monomeric 2-pyrrolidone, a catalyst embodying an alkali metal salt of 2-pyrrolidone the alkali metal being selected from the group consisting of rubidium and cesium, with an activator consisting of sulfur dioxide at a temperature of from 20° to 60° C. whereby a white polymer of 2-pyrrolidone is formed having thermal characteristics suitable for melt extrusion.

2. The method of claim 1 wherein the temperature of polymerization is from 38° to 42° C.

* * * * *